Aug. 16, 1966 H. H. ADELAAR 3,267,218

FOUR-WIRE/TWO-WIRE CONVERTER

Original Filed Feb. 18, 1959

Inventor
H.H. ADELAAR

By Albert Weiss

Attorney

United States Patent Office 3,267,218
Patented August 16, 1966

3,267,218
FOUR-WIRE/TWO-WIRE CONVERTER
Hans Helmut Adelaar, Antwerp, Belgium, assignor to International Standard Electric Corporation, New York, N.Y., a corporation of Delaware
Continuation of application Ser. No. 794,130, Feb. 18, 1959. This application Sept. 8, 1964, Ser. No. 396,799
Claims priority, application Netherlands, Mar. 18, 1958, 225,945
10 Claims. (Cl. 179—15)

Figures 1, 2, 3, 4:
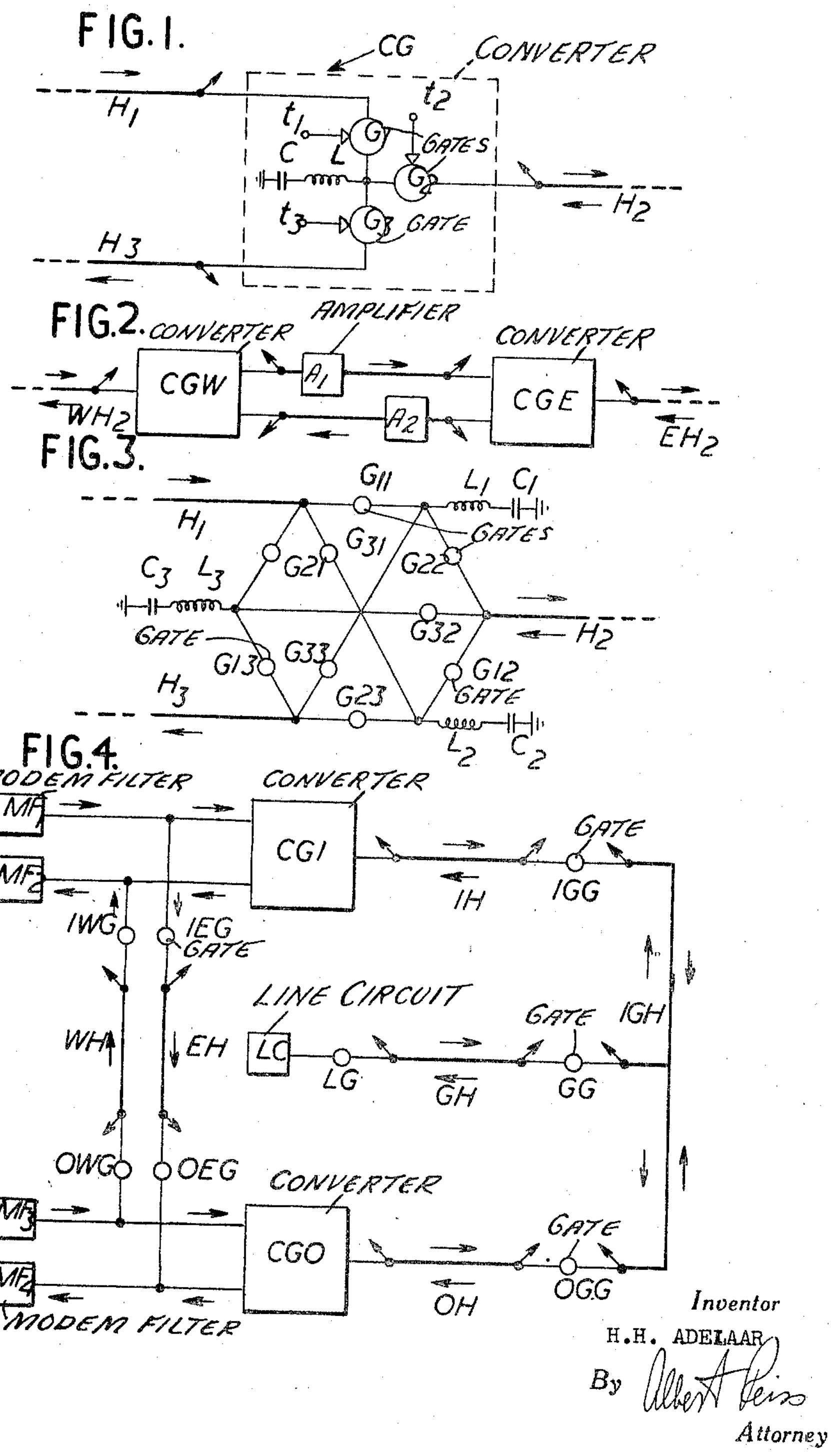

This is a continuation of application Serial No. 794,130, filed February 18, 1959.

The invention relates to a four-wire/two-wire converter of the type used in telecommunication systems, and more particularly, to a converter adapted to cope with short pulses such as encountered in time division multiplex systems.

Various proposals have already been made in relation to electronic telephone exchanges, and more particularly those operating on a time division multiplex basis. The first proposals mostly envisaged four-wire circuits throughout the exchange to permit the use of separate amplifiers for the go and return path, these amplifiers being needed in the exchange to compensate the losses such as due to the sampling technique involved in electronic time division multiplex switching systems using pulse amplitude modulation.

More recent proposals involve the use of so-called pulse modem circuits such as disclosed in the U.S. application 550,163 of November 30, 1955 and application Serial No. 663,704 of June 5, 1957. In these arrangements, the signal energy is stored in reactive storage devices and by interconnecting two such storage devices on a tuned circuit basis for a short time, corresponding to a half period of oscillation of this tuned circuit, transfer of the signal energy from one storage device to the other can be performed substantially without losses and moreover, such transfer of energy can be bi-directional. Thus, an electronic telecommunication exchange operating on a time division multiplex basis can be realized as a two-wire system, or one using ground return, the short time during which energy is exchanged between a pair of storage devices corresponding to a time channel on the multiplex time division links or highways used in such a system, and which links or highways are used in a bi-directional manner.

The first type of systems mentioned above requiring amplification for each of the go and return time division multiplex links could eventually be transformed into a two-wire system for instance by using two four-wire/two-wire converters on each bi-directional time division multiplex link in order to permit the insertion of unidirectional amplifiers, one for each direction. The use of conventional hybrid coil networks for such a purpose would however introduce problems which cannot be practically solved. Apart from the complexity of the balancing networks required for such conventional four-wire/two-wire converters if they are to be inserted in a time division multiplex link, and apart from the use of adequate filters in each of the four-wire branch circuits in order to suppress all frequencies outside the useful band, there remains the required bandwidth for such converters. A bandwidth ranging from D.C. into the megacycle region would be required, and this cannot be realized with conventional hybrid coil networks. Moreover, at each converter a loss of 3 decibels would have to be admitted. The so-called resistive hybrid networks could provide the required bandwidth, but with these, the loss question is aggravated since each resistive hybrid network would introduce a loss of 10.7 decibels.

In the second type of time division multiplex switching systems, amplification of local call signals might not be absolutely essential since the overall losses for such a call might be kept small and of the order of 3 decibels. Nevertheless, such electronic telecommunication exchanges would have to be connected to other exchanges and such connections through long distance toll lines essentially involve four-wire circuits. These four-wire circuits are required whenever unidirectional amplifiers must be inserted. Though amplifiers of the negative impedance type are bi-directional devices, these may generally be used only in relatively short connections over a restricted bandwidth. Hence, even if such bi-directional electronic telecommunication exchanges do not always need amplification of local calls, four-wire/two-wire converters are still required to connect the bi-directional time division multiplex links to the outgoing and incoming four-wire junctions. If these junctions are unidirectional time division multiplex links, generally operating on a pulse code modulation basis with the help of encoders and decoders to convert from and into pulse amplitude modulation, the same difficulties as outlined above are met in relation to the four-wire/two-wire converters. If the incoming and outgoing two-wire junctions are voice frequency junctions, or if in any case demodulation to and modulation from voice frequency has to be resorted to for connections to other exchanges, conventional hybrid coil networks may then be used. For connections to and from outgoing and incoming voice frequency junctions, a hybrid coil network will be required for each four-wire junction each time involving a loss of at least 3 decibels.

The object of the invention is to realize a novel four-wire/two-wire converter which among its advantages, is adapted to cope with high frequency signals and which does not suffer from appreciable losses.

In accordance with a first characteristic of the invention, a four-wire/two-wire converter is characterized in that it comprises a reactive storage device and at least three gates connecting said reactive storage device to the receive line, the send line and the transfer line respectively which gates are repeatedly unblocked during non-coincident short time intervals, e.g. 5 microseconds, constituting time positions in a cycle of, e.g. 20, such time positions that said lines are adapted to cooperate with said reactive storage device in such a manner that energy may be exchanged on a tuned circuit basis between reactive storage devices associated to said lines and the reactive storage device of said converter on a time division basis, without substantial losses or reflections, and that the three non-coincident time positions repeatedly used to obtain access to said reactive storage device are in such a sequence that, within any cycle, the time position allotted to said bi-directional line follows that allotted to said incoming line and precedes that allotted to said outgoing line whereby substantially no energy is exchanged between said incoming and outgoing lines.

It is to be noted that the use of such a reactive storage device exchanging signal energy in a first and then in a second time position is in itself already known from the Belgian Patent No. 558,096. In this patent, such storage devices are used as intermediate stores between two cascaded time division multiplex bi-directional links or highways so that a transmssion through these two cascaded links can take place without necessarily using the same time positions or channels in both links for the same communication.

The above mentioned and other objects and characteristics of the invention and the best manner of attaining them will be better understood from the following detailed description of embodiments to be read in conjunction with the accompanying drawings which represent:

FIG. 1, a four-wire/two-wire converter in accordance with the invention;

FIG. 2, the conventional interconnection of two converters of the type shown in FIG. 1 to enable the insertion of unidirectional repeaters in a bidirectional two-wire connection;

FIG. 3, a set of three converters as shown in FIG. 1 interconnecting a bi-directional multiplex link with a forward and a return unidirectional multiplex link; and FIG. 4, a diagram of an electronic telephone exchange using bi-directional multiplex links and adapted to serve as a tandem exchange.

Referring to FIG. 1, a bi-directional time division multiplex link $H_2$, which may for example be part of an electronic telephone exchange and lead to subscribers line circuits through gates and further bi-directional time division multiplex links or highways, is shown. These subscriber circuits (not shown) will include reactive stores of the type defined above and connected to the subscribers' lines through suitable low pass filters which either recover the voice frequency energy destined to the respective subscribers, or pass similar voice frequency energy emanating from said subscribers, for storage into the reactive store, ready to be sampled onto the highways to reach $H_2$.

The bi-directional highway $H_2$ is connected to the converter CG to which are also connected a return highway $H_1$ and a go highway $H_3$ which are multiplex links operated on a unidirectional basis. As shown by the multiple arrows, there may be a plurality of such converters CG interconnecting these three links, for example as many as there are time channels or time positions on each of said links.

Inside the converter CG, each of the three links $H_1$, $H_2$ and $H_3$ is connected via an individual gate $G_1$, $G_2$ and $G_3$ respectively to a common point which is grounded through an inductance L in series with a condenser C. This resonant reactive series circuit arrangement constitutes the reactive store of the type previously referred to and operating on a tuned circuit basis. Gates $G_1$, $G_2$ and $G_3$ are normally blocked and may be made conductive during respective non-coincident time channels $t_1$, $t_2$ and $t_3$.

If a communication on highway $H_1$ occupies time channel $t_1$, during the corresponding $t_1$ time positions, the gate $G_1$ will be made conductive. During such instants when gate $G_1$ is unblocked, a reactive store (not shown) connected to highway $H_1$ at such instants, will thus be connected to the reactive store L, C part of the converter CG. Hence, during time channel $t_1$, a sample of energy travelling through $H_1$ will be stored on the condenser C without substanial losses. In the same cycle, during the following time position $t_2$, the sample of energy stored on condenser C will be exchanged with a sample of energy coming through highway $H_2$, by virtue of gate $G_2$ being made conductive for time channel $t_2$. Thus, after gate $G_2$ is again blocked, the energy sample coming from highway $H_1$ has been passed to the bi-directional highway $H_2$, and in turn, condenser C is now storing the energy sample which was delivered by $H_2$ in exchange. Still during the same cycle, when $G_3$ is made conductive during time position $t_3$, the energy sample stored on condenser C will now be passed on highway $H_3$. Thus, provided that within any cycle the time position $t_2$ allotted to highway $H_2$ follows that allotted to $H_1$ and precedes that allotted to $H_3$, there will be substantially no transmission of energy between highways $H_1$ and $H_3$ as required. In practice, this balance will depend on the quality of the transmission through gate $G_2$, since if there is a reflection after gate $G_2$ is again blocked, there will remain on condenser C some signal corresponding to the incoming signal through highway $H_1$. This remaining signal would then be passed, in time channel $t_3$, to the go highway $H_3$. By an adequate design of this transmission circuit through highway $H_2$ and particularly of the modem filter in the subscribers line circuit connected at the other end of highway $H_2$, it will be possible to keep this reflection within permissible tolerances.

The converter of FIG. 1 operating on a cyclic gating principle thus constitutes a very simple converter which can secure substantial decoupling between the lines forming a four-wire connection and at the same time does not suffer from substantial energy losses.

FIG. 2 shows how pairs of such converters CGW and CGE can be provided to permit the insertion of unidirectional amplifiers in a time division multiplex link. This is split into a West part $WH_2$ and an East part $EH_2$, each connected to a converter CGW and CGE respectively. The four-wire ends of these two converters are respectively interconnected through multiplex links incorporating a unidirectional amplifier $A_1$ and $A_2$ respectively.

Moreover, in ordinary voice frequency systems wherein a substantial number of four-wire/two-wire voice frequency converters are required, it may even be justified to replace these by converters operating on a cyclic gating principle, whenever the provision of the necessary pulse generator equipment for the temporary conversion to a pulse system can be justified.

When pairs of converters are used substantially in the manner shown in FIG. 2, it will be realized that both the time channels used on $WH_2$ and that used on $EH_2$ should satisfy the sequential requirements mentioned above, i.e. within any cycle, the time position on $WH_2$ should follow that allotted to the communication on the highway including amplifier $A_2$, and precede that allotted to the highway including amplifier $A_1$, while a reverse condition is applicable with respect to the time position used on $EH_2$.

Thus, if one cannot readily control the choice of the time positions on the unidirectional highways once a time position is chosen on the bi-directional highway, the available free time positions on these unidirectional highways must be chosen while bearing in mind the sequential requirements. In the case of the arrangement shown in FIG. 2, these sequential requirements are thus more severe and would lead to artificial blocking.

The sequential requirements for the converter CGW and the converter CGE can however be disassociated by including an additional gate and an additional reactive storage device in converter CGE for example in the path from gate $G_1$ (FIG. 1) to the unidirectional link incorporating amplifier $A_1$. In this way, the energy travelling on this unidirectional link can be stored at any convenient time position in this additional reactive store from which it may then be taken through gate $G_1$ during another time position $t_1$ which may therefore satisfy the sequential requirements for the converter such as CGE independently of the time position actually used on the link such as that incorporating $A_1$. In this manner, the artificial blocking is substantially reduced. Moreover, the same decoupling arrangement using an additional reactive store can also be used on the side of the converter leading to the other unidirectional link, such as that incorporating amplifier $A_2$ and connected to converter CGE. Then, the three time positions for the converter can be chosen absolutely independently of the time positions actually used on the two unidirectional links and there must therefore be no fixed relation between those and the time position used on the bi-directional link.

Such additional decoupling arrangements will be particularly useful when the unidirectional multiplex links lead to other exchanges. In such cases, the time channels or time positions are defined in each central exchange by a common master pulse generator. While it is possible to synchronize the master pulse generators in various locations, the pulses travelling between the exchanges will be delayed due to the varying propagation times. With the pulses travelling at a speed of the order of 100 meters per microsecond, a distance of 15 km. therefore means a delay of some 150 microseconds corresponding to more than one sampling period, since this is generally of the order of 100 microseconds. Such a delay is not constant but subject to permanent fluctuations due to changes of temperature, humidity and other influences which cannot be readily controlled. While equalizing means may be provided, it is clear that an adequately controlled equalizer which can be automatically adjusted in accordance with instantaneous variations of propagation time will prove quite critical and expensive. Thus, when using for instance, interexchange pulse code modulation multiplex links, intermediate speech storage prior to reaching the converter will prove to be advantageous, the additional intermediate reactive store being fed under the control of synchronizing signals sent over the interexchange link together with the intelligence signals.

Whenever one may have full control on the choice of the time positions to be used in a converter, either when using the decoupling means mentioned above or when the highways $H_1$, $H_2$ and $H_3$ form a closed group each provided with the same number of time channels, a systemmatic predetermined relation between the three time positions may be used. With $3n$ time channels on each link for example, to a time channel $i$ in highway $H_1$, may always correspond time channel $n+i$ on highway $H_2$ and time channel $2n+i$ on highway $H_3$. Yet another arrangement is to use consecutive time positions so that a time channel $i$ on highway $H_1$ corresponds to time channel $i+1$ on highway $H_2$ and time channel $i+2$ on highway $H_3$.

This is shown in FIG. 3, and the number of converters now becomes independent of the number of time channels used on the highways. In fact, it now becomes equal to 3 which is evidently also the number of reactive storage devices required. Nine gates have been represented as interconnecting the three highways and the three reactive stores, such as gate $G_{11}$ between highway $H_1$ and the reactive store formed by inductance $L_1$ in series with condenser $C_1$. The first subscript for the gates refers to the time position during which this gate may be made conductive, while the second subscript refers to the highway to which this gate is connected at one end. Thus, gate $G_{31}$ for instance may be made conductive during time position No. 3 and it is connected to highway $H_1$. In this case, by time positions Nos. 1, 2 or 3, one means all time positions which in a cycle of three are in phase with the number of the position indicated. Thus, gate $G_{31}$ for instance may be made conductive not only during time position No. 3 but also No. 6, No. 9, etc. and the same applies with respect to those gates which can be made conductive during time positions No. 1 and 2 which respectively also mean 1, 4, 7 etc. and 2, 5, 8 etc.

If a signal is transmitted on highway $H_1$ during time channel No. 1 for instance, gate $G_{11}$ may be made conductive during that time channel and the sample of energy is transferred to condenser $C_1$. At the same time, a communication on highway $H_2$ may also be using time channel No. 1 on that highway, and by making gate $G_{12}$ conductive, energy samples may, during time position No. 1, be exchanged between highway $H_2$ and condenser $C_2$. Also, at the same time, time channel No. 1 may be engaged on the highway $H_3$ and by making gate $G_{13}$ conductive, the energy sample previously stored on condenser $C_3$ may be passed along to highway H. Dealing solely with the communication corresponding to time channel No. 1 being engaged on highway $H_1$, during time position No. 2 gate $G_{22}$ will be made conductive to pass the energy sample previously stored in condenser $C_1$ to highway $H_2$, and at the same time receive from that highway another energy sample now to be stored on condenser $C_1$. Therefore, during time position No. 3, gate $G_{33}$ may now be unblocked so that the energy sample on condenser $C_1$ is passed to highway $H_3$ as required. Condenser $C_1$ has now been discharged since highway $H_3$ is used in a unidirectional manner, whereby if time channel No. 4 is engaged on highway $H_1$, the unblocking of gate $G_{11}$ during time position No. 4 will permit to use condenser $C_1$ again for another communication during the same cycle.

In this manner, the reactive stores may be used in multiplex fashion for several simultaneous communications, i.e. as many as one-third of the total number of channels. But, of course, the imperfections in the modem filters leading to some amount of reflection would then imply some amount of crosstalk.

The converter which has been described above and which operates on a cyclic gating basis readily permits to connect four-wire transmission systems to an electronic pulse communication exchange of the type referred to. Through connections of four-wire junctions coming into an exchange on a four-wire basis and going out of the exchange again on a four-wire basis are in many conventional cases kept on a four-wire basis throughout the tandem exchange. This is often deemed to be desirable in order to avoid the use of two conventional hybrid coil arrangements in each tandem exchange, mainly because these hybrid coil arrangements each introduce a loss of 3 decibels and too many hybrid arrangements in a connection endanger its stability. When using the converter of the cyclic gating type disclosed above, this viewpoint may be reconsidered.

FIG. 4 shows the layout of a time division multiplex telephone exchange using reactive stores coupled on a tuned circuit basis.

Each subscriber's line (not shown) is connected to its individual line circuit LC which includes a modem low-pass filter terminated by the modem reactive store. This line circuit LC may be connected to the group highway serving this group of line circuits, e.g. 100, through a gate LG individual to the line circuit LC and which may be made repeatedly conductive during a time channel free on the group highway GH. This group highway GH may be selectively connected to an intergroup highway IGH through group gates such as GG which may be made conductive during the time channel seized on the calling group highway GH and also free on the selected intergroup highway IGH. In turn, this intergroup highway may be connected through another group gate GG to a group highway corresponding to the called subscriber, the same time channel being also used on that called group highway. Finally, this called group highway will be connected to the line circuit of the called subscriber through its individual gate. Of course, the time channel decoupling means disclosed in the Belgian Patent No. 558,096 can also be used.

Apart from being connected to the various subscribers group highways GH, the intergroup highway IGH may also be selectively connected to incoming junction highways IH and outgoing junction highways OH through incoming junction group gates IGG and outgoing junction group gates OGG respectively. On the other side opposite to the gates IGG and OGG, the incoming junction highways IH and the outgoing junction highways OH are each connected to a plurality of incoming junction converters CGI and outgoing junction converters CGO respectively, and of the type previously disclosed. The four-wire ends of these converters are connected to individual and unidirectional lines each leading to the modem filters $MF_{1/4}$. As shown, the modem filters $MF_{1/2}$ are used for each four-wire incoming junction IJ, while the modem filters $MF_{3/4}$ are used for each outgoing junction OJ, modem filters $MF_1$ and $MF_4$ being used for the forward path and modem filters $MF_2$ and $MF_3$ being used for the return path.

Disregarding for the present the connections directly interconnecting the four-wire sides of the converters CGI and CGO, it is seen that each incoming call on an incoming four-wire junction IJ may be passed to a selected four-wire outgoing junction OJ by using a bi-directional two-wire multiplex path through the exchange and involving an incoming junction highway IH, an intergroup highway IGH and an outgoing junction highway OH.

Thus, a four-wire tandem communication passes through the exchange on a two-wire basis. This may now be permissible with the converters of the type disclosed, since these do not suffer from the losses inherently associated with the hybrid coil arrangements. Moreover, balancing networks which must generally be quite complicated to secure an adequate balance are avoided. Indeed, reflection which may occur in modem circuits of the tuned circuit type can be kept at a very small value since it depends on the care in the design of the modem filters such as $MF_{1/4}$. But, whereas it would be expensive to design somewhat elaborate modem filters to be included in each line circuit LC, more intricate design may be quite justified for the modem filters incorporated on the incoming and outgoing junctions which are high efficiency circuits. Hence, using the four-wire/two-wire converters of the special type disclosed, it now becomes possible to treat tandem connections in the same way as connections terminating or originating in the exchange.

In some cases, however, reverting to two-wire cannot be admitted for a tandem connection. This will be the case for instance if amplification is required for the tandem connection whereas no such amplification is required for the local connections, nor for the terminating or originating connections. Then, the multiplex highways WH and EH operating uni-directionally may be provided, these being selectively connected on a time division multiplex basis to the go and return path of the incoming and outgoing junctions IJ and OJ through the gates IEG and IWG, and OEG and OWG respectively. Each of these highways WH and EH can then be readily provided with a unidirectional amplifier (not shown) if desired. It may be observed that in such a case, the same modem filters such as $MF_1$ are used in connection with terminating or originating connections, or in conjunction with the four-wire through-connecting multiplex links. Although only a single pair of through-connecting highways WH and EH has been shown in FIG. 4, it will of course be understood that if there are large groups of junctions going in many different directions, the through-connecting highways may for each direction be split into two series of cascaded highways, the first series being connected to the incoming junctions and the other series being connected to the outgoing junctions through the gates as shown on FIG. 4, while these two series of highways may be selectively interconnected with one another with the help of additional gates.

While the principles of the invention have been described above in connection with specific apparatus, it is to be clearly understood that this description is made only by way of example and not as a limitation on the scope of the invention.

What is claimed is:

1. A four-wire/two-wire converter comprising: three line-terminals, one for an incoming line of a four-wire line, one for an outgoing line of a four-wire line and one for a bi-directional line; three gates for respective line terminals, each gate having two terminals; means connecting one terminal of each gate to respective ones of said line terminals; a reactive storage device; the other terminals of said three gates being connected in common to said storage device; three non-coincident time channels for respective ones of said gates; and means connecting each of said time channels to its respective gate for cyclically unblocking said gates during said non-coincident time intervals whereby said incoming line, said bi-directional line and said outgoing line, in the order named, are connected to said storage device during said non-coincident intervals and exchange energy between the connected line and said storage device.

2. A four-wire/two-wire converter according to claim 1 wherein said storage device comprises an inductor and a capacitor for storing pulses on a tuned circuit basis.

3. A four-wire/two-wire converter for a 3-channel pulse multiplex system comprising: three four-wire/two-wire converters each having three gates and a common storage device according to claim 1; means connecting the three gates common to each channel to respective ones of the three storage devices; means connecting one gate of each of said three channels to said incoming line; means connecting a second gate of each of said three channels to said outgoing line; and means connecting the third gate of each of said three channels to said bi-directional line; and means connecting the three non-coincident time channels to all gates for simultaneously unblocking the gate for a first channel of the incoming channels, a gate for a second channel of the bi-directional channels, and a gate of the third channel of the outgoing channels; said simultaneous unblocking means operating cyclicly on one gate of each of the three gates connected respectively to the incoming line, the bi-directional line and the outgoing line in the order named.

4. A four-wire/two-wire converter for a 3-channel pulse multiplex system according to claim 3 wherein said three storage devices each comprises an inductor and a capacitor for storing pulses on a tuned circuit basis.

5. In a time division communication system, a two-way transmission line, an incoming one-way transmission line, an outgoing one-way transmission line, a converter, said converter comprising gating means connected to said two-way transmission line and send and receive gating means connected to said outgoing and incoming lines respectively, storage means, means connecting said storage means to said gating means, and connections to each of said gating means for receiving signals whereby suitable signals may be received for controlling the conductivity of the gating means.

6. A time-division communication system as set forth in claim 5 wherein said storage means includes first and second storage elements and wherein said send gating means comprises first and second send gates, said receive gating means comprises first and second receive gates, and said gating means in said two-way transmission line comprises a first gate connected to said first storage element and to said first send and first receive gates, and a second gate connected to said second storage element and said second send and second receive gates.

7. A time-division communication system as set forth in claim 6 wherein said first and second storage elements comprise first and second capacitances, and connection of said gating means in accordance with claim 6 prepares said second receive gate and said first send gate to respond simultaneously during a first time period to transfer information from said incoming transmission line to said second capacitance and from said first capacitance to said outgoing transmission line, respectively, and prepares said second send gate and said first gate to respond during a second time period to transfer information from said second capacitance to said outgoing transmission line and from said two-way transmission line to said first capacitance, respectively.

8. In a time division communication system, a two-way transmission line, an incoming transmission line, an outgong transmission line, storage means, a converter interconnecting said incoming and said outgoing transmission lines and said two-way transmission line, said converter comprising receive gating means and line gating means and send gating means connected between said respective lines and a common terminal of said storage means, and said gating means including separate terminals for receiving control signals, whereby suitable control signals may be received for controlling the conductivity of the gates in a sequence.

9. A time division switching system in accordance with claim 8 and further comprising inductance means connected between said storage means and said two-way transmission line.

10. A time-division switching system in accordance with claim 8 wherein said storage means comprises a capacitance.

References Cited by the Examiner

UNITED STATES PATENTS 2,962,552 11/1960 Crowley ............ 179—15

DAVID G. REDINBAUGH, *Primary Examiner.*

J. McHUGH, *Assistant Examiner.*